Oct. 27, 1953     W. H. SILVER     2,656,664
CANE TRASH MOVER

Filed March 24, 1949     4 Sheets-Sheet 1

FIG. I

INVENTOR.
WALTER H. SILVER
BY
ATTORNEYS

Oct. 27, 1953 W. H. SILVER 2,656,664
CANE TRASH MOVER

Filed March 24, 1949 4 Sheets-Sheet 3

*INVENTOR.*
WALTER H. SILVER
BY

*ATTORNEYS*

Oct. 27, 1953   W. H. SILVER   2,656,664
CANE TRASH MOVER
Filed March 24, 1949   4 Sheets-Sheet 4

*INVENTOR.*
WALTER H. SILVER
BY
ATTORNEYS

Patented Oct. 27, 1953

2,656,664

UNITED STATES PATENT OFFICE 2,656,664

CANE TRASH MOVER

Walter H. Silver, Moline, Ill., assignor to Deere & Company, Moline, Ill., a corporation of Illinois Application March 24, 1949, Serial No. 83,278

6 Claims. (Cl. 56—27)

The present invention relates generally to agricultural implements and more particularly to farm machinery for sugar cane cultivation and the like.

The object and general nature of the present invention is the provision of an implement for moving the trash, crop residue and other material, left on the field after the cane has been harvested, from the furrow between two rows over onto an adjacent furrow, so as to provide for cultivation along the cleaned furrow. According to this method of cultivation, the material from the adjacent furrow is moved back onto the first furrow the next year. This method of cultivating cane in alternate rows is preferred where heavy soil conditions exist. When using this method, growers preserve the valuable organic matter that is in the cane trash by moving the trash to intermediate rows and cultivating the rows without trash. The trash, crop residue or the like on the intermediate rows prevents weed growth, conserves moisture and provides humus to retain soil tilth. Where irrigation is practiced, water is run into the cultivating row or furrow and thus irrigates two rows of plants.

More specifically, it is a feature of the present invention to provide a semi-integral trash mover adapted to be carried at its front end on the rear portion of a conventional farm tractor and driven by suitable connections through the power take-off shaft of the tractor. In one form of the invention, the trash is moved by a plurality of laterally movable elements arranged to be driven by power and shifted at the necessary rate of operation transversely of the rows so as to pitch or toss the trash, crop residue and the like from the furrow between two rows of plants over onto the adjacent furrow. The trash-moving unit is in the form of a rotary brush supported on the implement frame so that the axis of rotation of the brush extends longitudinally of the furrow and preferably at a downwardly and rearwardly extending angle, or the trash-moving elements may be in the form of a plurality of laterally oscillatable forks or teeth, somewhat in the form of a hay tedder or side-delivery hay rake. It is, however, essential to have the trash-moving unit extend longitudinally of the furrow so as to sweep the latter clean of trash, leaves and the like with uniform action.

These and other objects and advantages of the present invention will be apparent to those skilled in the art after a consideration of the following description of the preferred structure in which the principles of the present invention have been incorporated, taken in conjunction with the accompanying drawings, in which.

Figure 1:
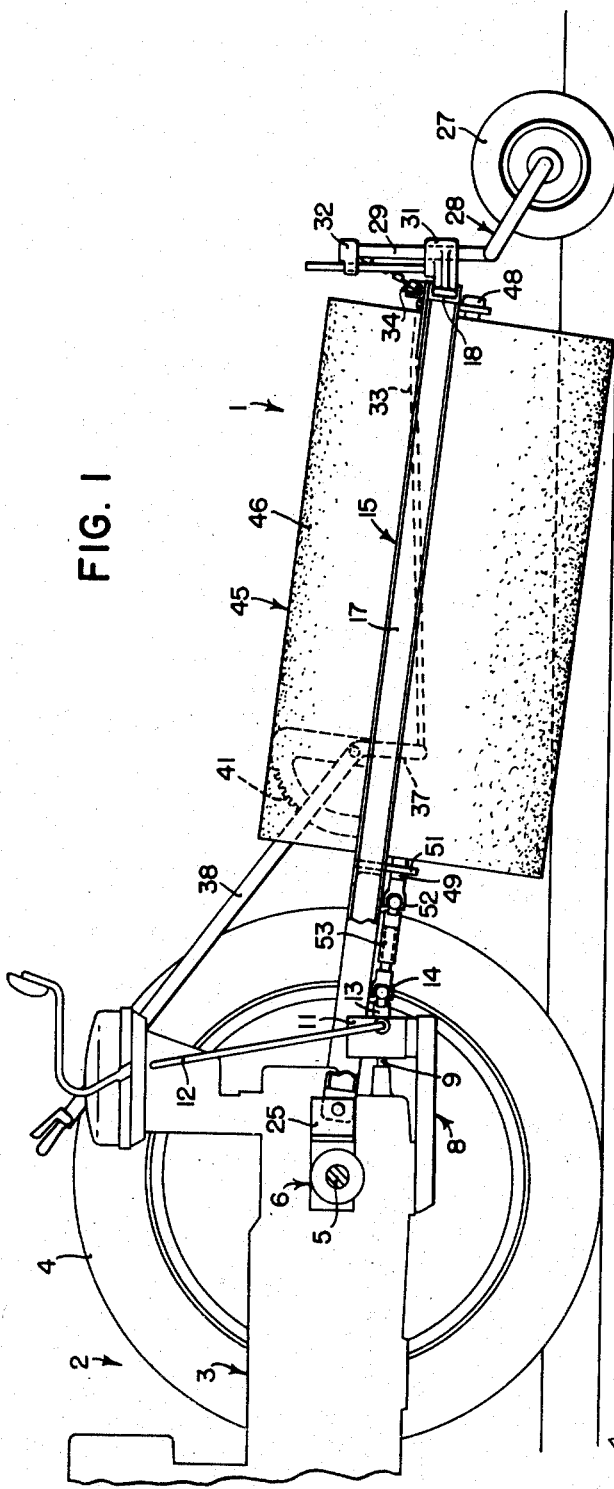
Figure 1 is a side view of one form of the present invention, showing the same as incorporating a brush-like trash-moving element.

Referring now to the drawings, particularly Figure 1, the trash-moving implement of the present invention is indicated in its entirety by the reference numeral 1 and is shown as operatively connected to a farm tractor 2 of conventional construction, embodying a power plant and frame unit 3 carried on front wheels (not shown) and a pair of rear driving wheels 4. The wheels 4 are mounted on axle shafts 5 journaled in a rear axle construction 6. The tractor 2 also includes a stationary drawbar support 8 and above the latter a power take-off shaft 9. According to the present invention, the drawbar support 8 carries a change-speed gear unit 11 which is controlled by a hand lever 12. The unit 11 may be of any suitable construction and, according to the position of the gear shift lever 12, receives power from the power take-off shaft 9 and delivers it at different optional speeds to a driven shaft 13 to the rear end of which a universal joint 14 is connected.

The trash-moving implement 1 comprises a rectangular frame 15 having a pair of fore and aft extending, laterally spaced frame bars 16 and 17 connected together at their rear ends by a cross bar 18 and at their front portions by a forward cross bar 19. The front ends of the frame bars 16 and 17 carry attaching plates 21 and 22 which are pivotally connected, as at 23, to brackets 24 and 25 that are mounted on the rear sides of the outer portions of the rear axle 6. The rear end of the frame 15 is supported on a caster wheel 27. The caster wheel 27 is mounted on the rear portion of a caster wheel axle member 28 which includes an upwardly extending spindle section 29 mounted for movement about a vertical axis in a spindle bracket 31 fixed in any suitable manner to the central portion of the rear cross bar 18. A cap 32 is connected to the upper end of the spindle section 29 and receives the rear end of a raising and lowering chain 33 which is trained over a pair of sheaves 34 and 35 carried by the frame 15. The chain 33 extends forwardly and is connected at its forward end to the lower end 37 of an adjusting lever 38 which is pivoted on the right-hand frame bar 16 and is equipped with the usual detent mechanism 39 operating over a sector 41 fixed to the frame bar 16.

Rotatably mounted on the frame 15 is a trash-moving unit 45 which, in the form of the invention, is in the nature of a brush member, having a plurality of fairly rigid bristles 46 fixed in any suitable way to a central shaft 47. The latter is supported by suitable bearing means 48 at the rear of the machine and by forward bearing means 49 at the front of the machine, the bearing means 48 being carried by the rear cross bar 18 and the forward bearing means being supported by a bracket 51 carried centrally on the forward cross bar 19. The front end of the shaft 47 is connected by a universal joint 52 and a pair of telescopic shaft sections 53 to the universal joint 42 at the rear end of the power take-off shaft 9.

In operation, the tractor wheels 4 are adjusted so as to span two rows of plants so as to position the brush unit 45 directly over the furrow between the rows of plants and extending generally longitudinally thereof, the shaft 47 being at an angle to the horizontal, as best shown in Figure 1, so as to cause the forwardmost portions of the brush 45 to engage the uppermost portions of the trash lying in the furrow over which the unit 45 is disposed. When the power take-off shaft 9 of the tractor is connected so as to be driven by the tractor motor, the operator positions the lever 12 to secure the desired rate of rotation and the power is thus transmitted by the speed-change unit 11 to the telescopic shaft sections 53 and the brush shaft 47. The latter is thus driven by power from the tractor at a speed sufficient to toss all of the trash and the like from the furrow over which the tractor is driven onto the adjacent furrow. The hand lever 38 is adjusted so as to insure that the rearmost portions of the brush engage low-lying leaves and the like and that all of the trash, leaves, crop residue and the like will be removed from the furrow. At the end of the field, the hand lever 38 is swung upwardly and rearwardly so as to raise the brush unit 45 out of engagement with the trash, the rear end of the implement being carried on the caster wheel 21 at all times.

Figure 2:
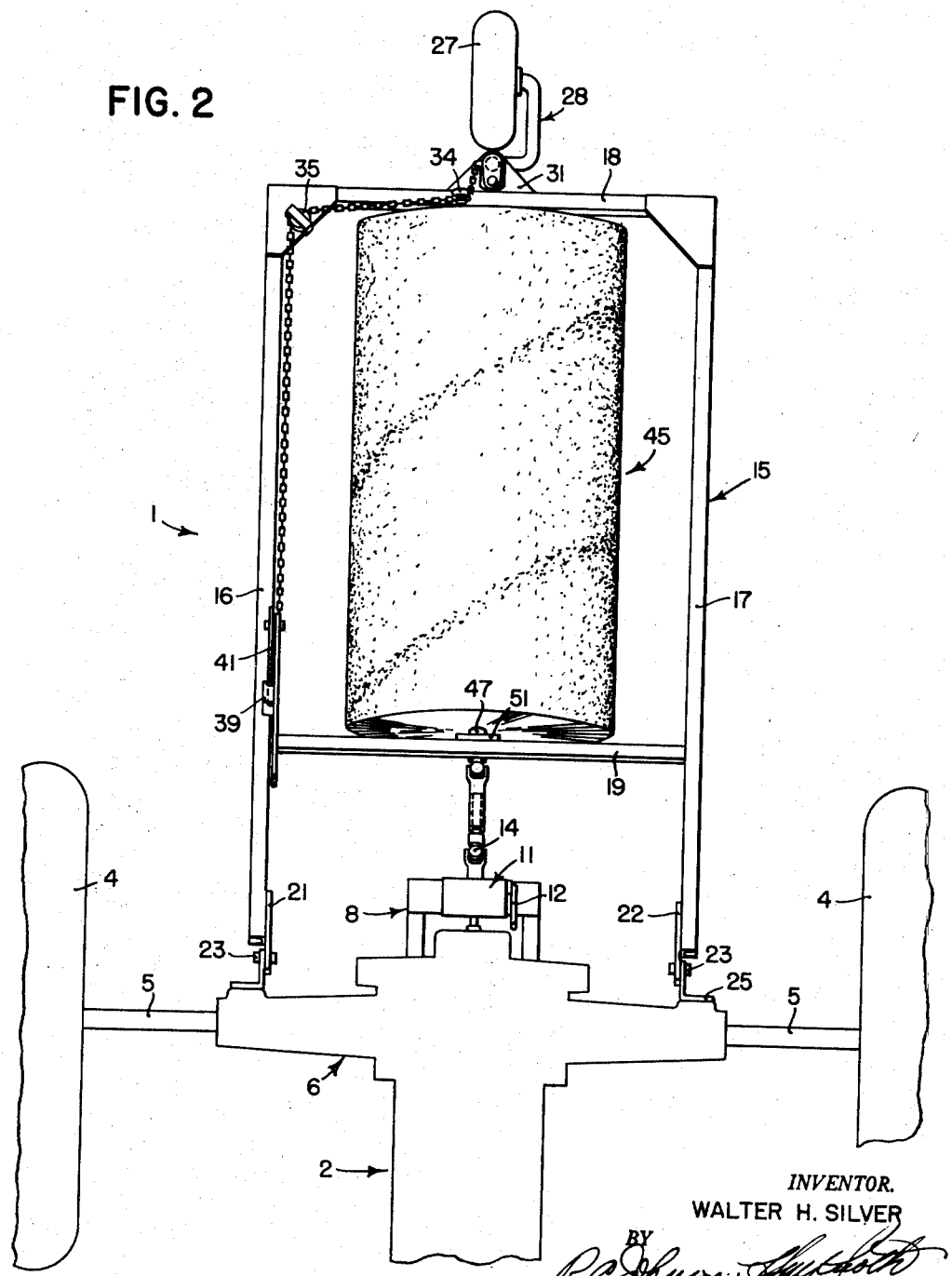
Figure 2 is a plan view of the implement shown in Figure 1.
Figure 3:
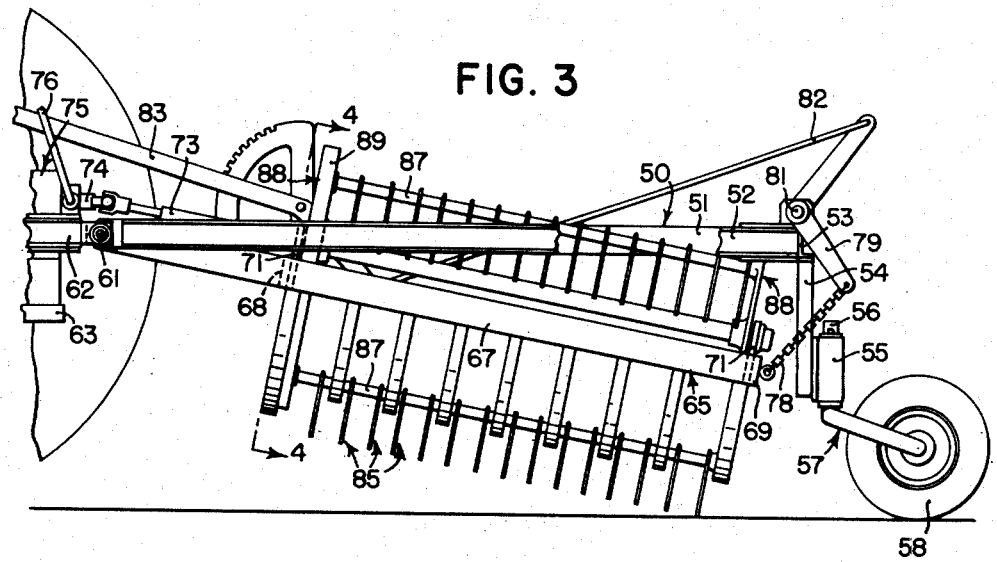
Figure 3 is a side view of another form of the present invention.
Figure 4:
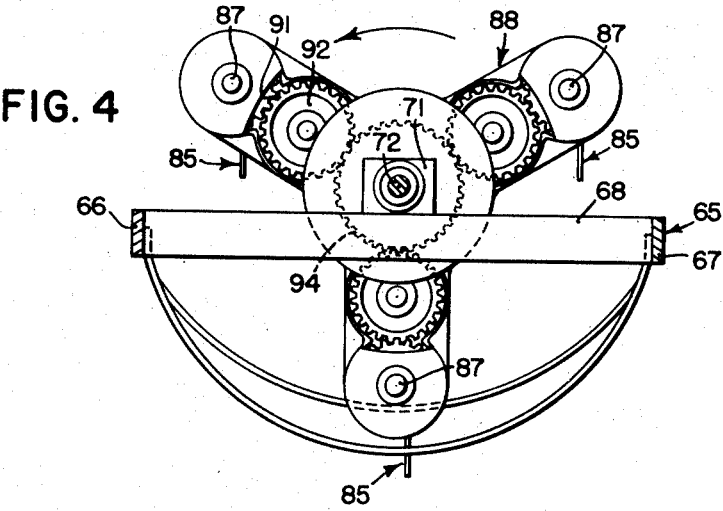
Figure 4 is a view taken generally along the line 4—4 of Figure 3.

Instead of a brush-like trash mover, the implement of the present invention may be provided with laterally driven teeth, somewhat in the nature of a side-delivery hay rake. This form of the invention is shown in Figures 3 and 4. Referring to these figures it will be seen that this form of the invention incorporates a frame 50 comprising a pair of longitudinally extending, laterally spaced frame channels 51 and 52 and a rear frame channel 53 to which a depending bracket 54 is fixed. The lower end of the bracket 54 receives a vertical sleeve 55 in which the upper or spindle portion 56 of a caster wheel axle 57 on which a rear caster wheel 58 is journaled. The front ends of the frame bars 51 and 52 are pivotally connected, as at 61, to a pair of brackets 62 fixed in any suitable way to the rear axle of a conventional farm tractor, which may be of the same construction as described above in connection with Figures 1 and 2.

A generally rectangular sub-frame 65 is carried by the frame 50 and comprises longitudinally extending bars 66 and 67 and front and rear cross bars 68 and 69 to each of which a bracket 71 is fixed. A shaft 72 (Figure 4) is supported by suitable bearing means in the bracket 71 and is connected at its forward end to a telescopic shaft section 73 with the driven shaft 74 of a speed-change unit 75, which may be similar to or identical with the unit 11 described above. The unit 75 is controlled by a hand lever 76. The front ends of the frame bars 66 and 67 are pivotally connected with the frame 59, preferably by means of a transverse cross shaft which forms the pivot means 61 mentioned above.

The rear end of the sub-frame 65 is supported from the rear portion of the main frame 50 by means of a pair of links 78 connected at their lower ends to the cross frame bar 69 and at their upper ends to a pair of arms 79 fixed to a rear cross shaft 81. An arm on the latter shaft is connected by a link 82 to a hand lever 83 on the main frame, and moving the hand lever 83 to different positions raises or lowers the rear end of the sub-frame 65.

The sub-frame 65 carries a plurality of laterally movable trash-engaging elements 85, preferably in the form of pairs of teeth arranged in three sets, each set of teeth being fixed to a rotatable tooth bar 87 (Figure 4). The three tooth bars 87 are journaled in generally Y-shaped tooth bar supports 88 which are fixed to front and rear portions of the shaft 72. The front tooth bar support 88 includes a casing 89 which encloses three sets of gears 91 and 92. Each gear 91 is fixed to the associated tooth bar shaft 87, as best shown in Figure 4, and the gear 92 is supported for rotation on the adjacent portion of the tooth bar support member 88. Each pair of gears 91 and 92 are in mesh with one another, and the radially innermost gears 92 are arranged in mesh with a stationary gear member 94 fixed to the sub-frame 65 at the front end of the trash-moving unit. These gears function to maintain the trash-engaging teeth 85 in a generally vertical plane while they are swung laterally by the rotation of the shaft 72 and the tooth bar supports 88 fixed thereto. The shaft 72 is arranged at an angle to the horizontal, the shaft 72 extending downwardly and rearwardly whereby the laterally moving teeth 85 engage and move the trash in the furrow along which the tractor is driven over onto an adjacent furrow.

Figure 5:
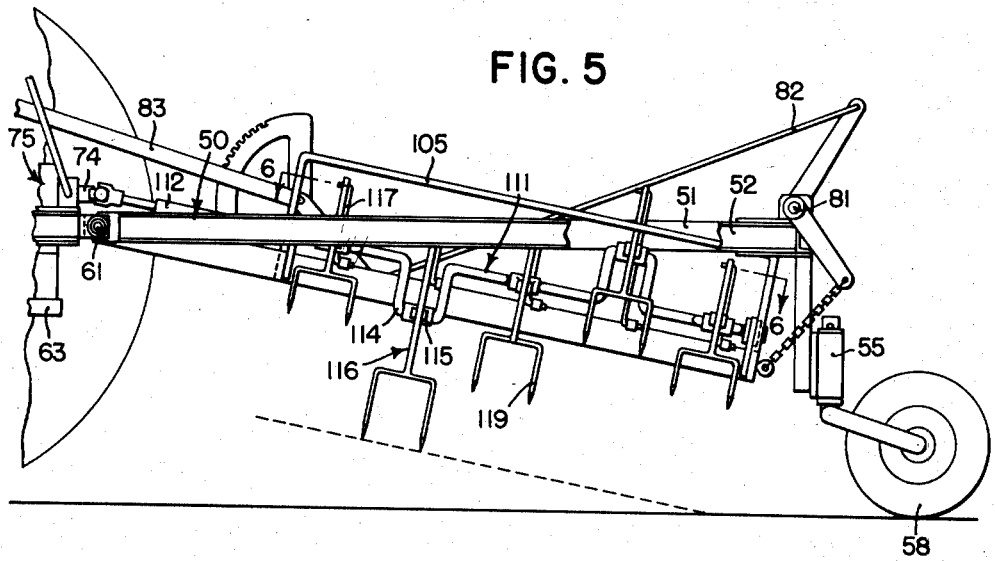
Figure 5 is a side view of a third form of the present invention.
Figure 6:
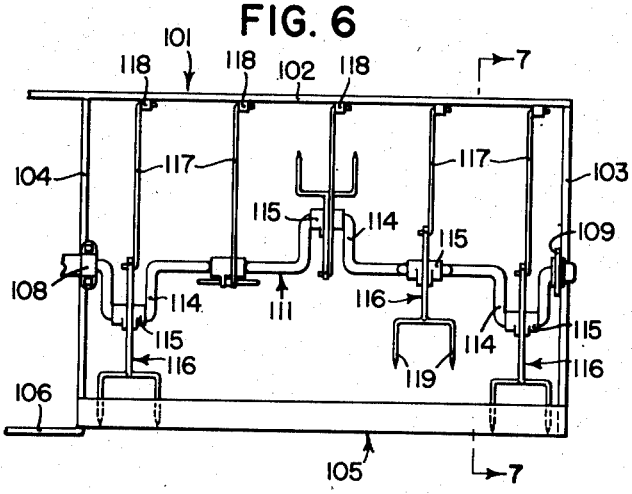
Figure 6 is a partial plan view of the implement shown in Figure 5.
Figure 7:
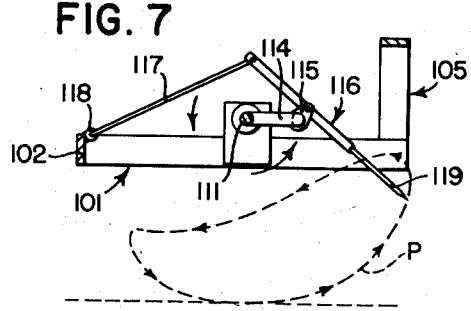
Figure 7 is a fragmentary sectional view taken along the line 7—7 of Figure 6.

A third form of the invention is shown in Figures 5–7. This form of the invention is somewhat similar to that shown in Figures 3 and 4 in that the trash-moving elements are supported in a sub-frame that is carried by a main frame pivotally connected with the tractor at its forward end and supported at its rear end on a caster wheel. Referring now to Figures 5–7, the main frame of this form of the invention is substantially the same as described above in connection with Figures 3 and 4 and hence the same reference numerals have been used for parts that are common to the two forms of this invention. As best shown in Figures 6 and 7, a generally rectangular sub-frame 101 is carried by the main frame 50 and comprises a right-hand frame bar 102, a rear cross frame bar 103, a front cross frame bar 104, and an arched left-hand cross bar 105. The forward end of the right-hand frame bar 102 is carried on the right-hand portion of the cross shaft 61 and the front portion of the arched frame bar 105 is fixed to a forwardly extending section 106 which is pivotally connected to the left-hand portion of the cross shaft 61. The central portions of the cross frame bars 103 and 104 carry front and rear bearing brackets 108 and 109 in which a crankshaft 111 is mounted for rotation. The front end of the crankshaft 111 is connected by a telescopic shaft section 112 to the driven shaft 74 of the speed-change unit 75 (Figure 5), and the crankshaft 111 is provided with a plurality of crank throws 114. A bearing member 115 connects each crank throw 114 to a laterally swingable trash-engaging fork member 116. As best shown in Figure 7, each fork member 116 is connected at its upper end to a fork-control rod 117, the right end of which is pivotally connected, as at 118, to the frame bar 102. The lower portion of each fork member 116 is provided with two or more tines 119.

In this form of the invention the operation is best illustrated in Figure 7. When the crankshaft 111 is rotated, the fork members 16 are oscillated laterally, the tine portions moving along a path of movement indicated by the reference character P which causes the fork portions to be moved laterally of the furrow in a position engaging the trash and the like lying therein. During the upper part of the movement of the tines, the latter are withdrawn from the trash, and in operation the fork members 116 are driven at such speed that all trash, crop residue and the like lying in the furrow over which the unit passes is pitched or tossed onto the next adjacent furrow. The rear end of the sub-frame 105 is raised and lowered by substantially the same arrangement shown in Figures 3 and 4.

While I have shown and described above the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore, and desire to secure by Letters Patent is:

1. An agricultural machine comprising a mobile frame adapted to be propelled along a furrow between two spaced crop rows, and a trash moving device including a frame structure adapted to be disposed to extend directly rearwardly from said mobile frame, means connecting said frame structure with said mobile frame so as to be rigid therewith against lateral tilting, a plurality of trash moving means carried by said frame structure and disposed so as to act directly transversely of the rows, each of said trash moving means comprising an element having sufficient rigidity to be self-supporting, means receiving the inner end portions of said elements for movably supporting said trash moving means from said frame structure in a generally downwardly and rearwardly extending series so as to act on trash, crop residue and the like in the furrow progressively from top to bottom thereof, and means for driving said elements at a relatively slow rate so as to move the trash, crop residue and the like into the adjacent furrow so as to clear the first mentioned furrow for subsequent cultivating or irrigating operations or the like.

2. For use with a tractor having a power take-off shaft, and driving wheels spaced apart laterally to span the furrow between two adjacent crop rows: the improvement comprising a frame adapted to extend rearwardly of the tractor over said furrow, means for connecting the forward portion of said frame to the rear portion of the tractor to provide for generally vertical movement of said frame relative to the tractor, a trash-removing device in the form of a rotary brush member having a multiplicity of resilient trash-engaging elements extending generally radially and a shaft supporting said elements, means for supporting said shaft for rotation in said frame in a position in which said shaft extends rearwardly and downwardly, means for driving said shaft from the power take-off shaft of the tractor, the angle of said trash shaft being such that the forwardmost bristle elements move in a path generally above the uppermost portions of the trash, crop residue and the like lying in said furrow and the rearmost bristle elements substantially engaging the ground, whereby when said trash-removing device is rotated, the trash, crop residue and the like will be tossed laterally into an adjacent furrow, and a generally centrally disposed ground-engaging support at the rear of said frame for supporting the latter and positioned rearwardly of said trash-removing device so as to pass along the space cleared by said device.

3. For use with a tractor having driving wheels spaced apart laterally to span the furrow between two adjacent crop rows: the improvement comprising a frame adapted to extend directly rearwardly of the tractor over said furrow, said frame having a width such that the frame extends rearwardly between the vertical longitudinal planes of said driving wheels, means for connecting the forward portion of said frame to the rear portion of the tractor to provide for generally vertical movement of said frame relative to the tractor, a plurality of trash-engaging elements movable substantially directly transversely of the rows and carried by said frame in a downwardly and rearwardly extending series, whereby the forwardmost elements engage the top portions of said trash and the rearmost elements engage the lowermost portions of said trash, the paths of movement of said trash-engaging elements also lying between said vertical longitudinal planes and means for driving said trash-engaging elements.

4. An agricultural machine comprising a mobile frame adapted to be propelled along the furrow between two spaced crop rows, and a trash-moving device including a shaft carried by said frame in a downwardly and rearwardly extending position so as to be aligned longitudinally with said furrow, a pair of tooth bar heads fixed to opposite ends of said shaft, longitudinally disposed tooth bars rotatably mounted in said heads in parallel relation with respect to said shaft, teeth carried by said bars, a stationary gear carried by said frame, gearing connecting said stationary gear with said rotatable tooth bars, whereby when said shaft is rotated said tooth bars revolve about the axis of said shaft and said teeth are held in a generally given angular relation with respect to the ground, and means for rotating said shaft.

5. An implement frame adapted to extend rearwardly from the tractor over the furrow spanned thereby, means for pivotally connecting the front end of said frame with the tractor, a sub-frame pivotally connected at its forward end with the forward portion of said first mentioned frame, a trash-moving device carried by said sub-frame and including elements movable laterally of the furrow for removing trash from the latter and depositing the same laterally into an adjacent furrow, means for raising and lowering the rear end of the sub-frame relative to the rear portion of said first mentioned frame, and ground-engaging means at the rear end of said first frame disposed to pass along the space in said furrow from which trash has been removed.

6. The invention set forth in claim 5, further characterized by said frame being hinged to the tractor for vertical movement relative thereto about a transverse axis, and said ground-engaging means comprising a laterally swingable caster wheel.

WALTER H. SILVER.

References Cited in the file of this patent

UNITED STATES PATENTS

| Number | Name | Date |
|---|---|---|
| 715,812 | Johnston | Dec. 16, 1902 |
| 1,787,228 | Zalesky | Dec. 30, 1930 |
| 2,084,398 | Jongeneel | June 22, 1937 |
| 2,250,948 | Garst | July 29, 1941 |
| 2,354,112 | Garst | July 18, 1944 |
| 2,476,183 | Fergason | July 12, 1949 |

FOREIGN PATENTS

| Number | Country | Date |
|---|---|---|
| 454,085 | Germany | Jan. 2, 1928 |